United States Patent
Abe (10) Patent No.: US 10,320,258 B2
(45) Date of Patent: Jun. 11, 2019

(54) STATOR, MOTOR, DISK DRIVE APPARATUS, AND METHOD OF MANUFACTURING STATOR

(71) Applicant: Nidec Corporation, Kyoto (JP)

(72) Inventor: Hiroyuki Abe, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/752,618

(22) PCT Filed: Sep. 21, 2016

(86) PCT No.: PCT/JP2016/077897
§ 371 (c)(1),
(2) Date: Feb. 14, 2018

(87) PCT Pub. No.: WO2017/057153
PCT Pub. Date: Apr. 6, 2017

(65) Prior Publication Data
US 2019/0036410 A1 Jan. 31, 2019

(30) Foreign Application Priority Data

Sep. 28, 2015 (JP) .................................. 2015-189176

(51) Int. Cl.
G11B 19/20 (2006.01)
H02K 3/52 (2006.01)
(Continued)

(52) U.S. Cl.
CPC ......... *H02K 3/522* (2013.01); *G11B 19/2009* (2013.01); *H02K 1/146* (2013.01);
(Continued)

(58) Field of Classification Search
None
See application file for complete search history.

(56) References Cited

U.S. PATENT DOCUMENTS 8,908,324 B1 * 12/2014 Taki .................... H02K 3/28
360/99.08
9,369,019 B1 * 6/2016 Abe ..................... H02K 3/28
(Continued)

FOREIGN PATENT DOCUMENTS

JP 2010-239695 A 10/2010

OTHER PUBLICATIONS

Official Communication issued in International Patent Application No. PCT/JP2016/077897, dated Dec. 6, 2016.

*Primary Examiner* — William J Klimowicz
(74) *Attorney, Agent, or Firm* — Keating & Bennett, LLP (57) ABSTRACT

In this stator, a passage line extending in a circumferential direction is disposed in a circumferential gap between two circumferentially adjacent ones of coils. A lead wire continuous with a conducting wire defining one of the coils includes a bend portion being bent in the gap with the passage line serving as a supporting point; a led-out portion arranged to extend from the coil to one side in an axial direction to the bend portion; and a connection portion arranged to extend from the bend portion to another side in the axial direction. At least a portion of a portion of the lead wire which overlaps with the passage line when viewed in a radial direction is arranged at a radial position between the passage line and a core back. Thus, the lead wire is bent with the passage line serving as the supporting point to reverse the direction in which the lead wire runs in the axial direction, and this contributes to preventing a slackening of the connection portion of the lead wire from causing the lead wire to be slackened to the one side in the axial direction. This in turn reduces the likelihood that the lead wire will be brought into contact with a member arranged on the one side of the stator in the axial direction.

11 Claims, 8 Drawing Sheets

(51) Int. Cl.

| | | |
|---|---|---|
| *H02K 3/50* | (2006.01) | |
| *H02K 1/14* | (2006.01) | |
| *H02K 1/27* | (2006.01) | |
| *H02K 1/30* | (2006.01) | |
| *H02K 3/18* | (2006.01) | |
| *H02K 7/08* | (2006.01) | |
| *H02K 15/00* | (2006.01) | |
| *H02K 15/02* | (2006.01) | |
| *H02K 15/095* | (2006.01) | |
| *H02K 21/22* | (2006.01) | |

(52) U.S. Cl.
CPC ............. *H02K 1/2786* (2013.01); *H02K 1/30* (2013.01); *H02K 3/18* (2013.01); *H02K 3/50* (2013.01); *H02K 3/52* (2013.01); *H02K 7/088* (2013.01); *H02K 15/0062* (2013.01); *H02K 15/022* (2013.01); *H02K 15/095* (2013.01); *H02K 21/22* (2013.01); *H02K 2203/06* (2013.01)

(56) References Cited

U.S. PATENT DOCUMENTS

| | | | |
|---|---|---|---|
| 9,748,811 B2* | 8/2017 | Asano | H02K 3/12 |
| 2006/0138892 A1* | 6/2006 | Hagino | H01R 39/32 |
| | | | 310/198 |
| 2008/0278023 A1* | 11/2008 | Yamagata | H02K 15/095 |
| | | | 310/198 |

* cited by examiner

STATOR, MOTOR, DISK DRIVE APPARATUS, AND METHOD OF MANUFACTURING STATOR

BACKGROUND OF THE INVENTION

1. Field of the Invention

The present invention relates to a stator, a motor, a disk drive apparatus, and a method of manufacturing the stator.

2. Description of the Related Art

Spindle motors arranged to rotate disks are typically installed in hard disk apparatuses and optical disk apparatuses. Three-phase motors are generally used as the spindle motors. In a stator of the three-phase motor, three conducting wires are wound around a plurality of teeth of a stator core, so that coils are defined. A known stator is described in, for example, JP-A 2010-239695.

In such a stator, winding end portions and winding start portions of the three conducting wires are connected to a circuit board as lead wires and common wires. If any of the lead wires and the common wires becomes slack and is brought into contact with another member, a problem, such as, for example, a failure in rotation, may occur during rotation of a motor. Accordingly, in the stator described in JP-A 2010-239695, a portion of the lead wire or the common wire is held between a core back and an oblique portion of a passage line to restrain this portion from being slackened in a radial direction (see paragraphs [0006] and [0007]).

SUMMARY OF THE INVENTION

However, in the case of the configuration of JP-A 2010-239695, if the lead wire or the common wire is pushed from the side on which the circuit board lies, the lead wire or the common wire may be lifted in an axial direction to be brought into contact with another member. Therefore, it is desirable that each of the lead wires and the common wires is prevented from being slackened in the axial direction as well.

A first exemplary embodiment of the present invention is directed to a stator for use in a motor, the stator including a stator core including an annular core back arranged in an annular shape with a central axis as a center, and a plurality of teeth arranged to extend radially from the core back; and a plurality of coils each of which is defined by a conducting wire wound around a separate one of the teeth. A passage line extending in a circumferential direction is disposed in a circumferential gap between two circumferentially adjacent ones of the coils. A lead wire continuous with the conducting wire defining one of the coils includes a bend portion being bent in the gap with the passage line serving as a supporting point; a led-out portion arranged to extend from the coil to one side in an axial direction to the bend portion; and a connection portion arranged to extend from the bend portion to another side in the axial direction. At least a portion of a portion of the lead wire which overlaps with the passage line when viewed in a radial direction is arranged at a radial position between the passage line and the core back.

A second exemplary embodiment of the present invention is directed to a method of manufacturing a stator including a stator core and a plurality of coils, the stator core including a core back arranged in an annular shape with a central axis as a center, and a plurality of teeth arranged to extend radially, each of the plurality of coils being defined by a conducting wire wound around a separate one of the teeth, the method including the steps of a) winding the conducting wire around each of the plurality of teeth to define the plurality of coils, and disposing a passage line extending in a circumferential direction in a circumferential gap between circumferentially adjacent ones of the coils; and b) bending a lead wire of the conducting wire with the passage line serving as a supporting point, the lead wire being an end portion of the conducting wire on one end side of portions of the conducting wire which define the coils and the passage line.

According to each of the first and second exemplary embodiments of the present invention, the lead wire is bent with the passage line serving as the supporting point to reverse the direction in which the lead wire runs in the axial direction. This contributes to preventing a slackening of the connection portion of the lead wire from causing a slackening of the lead wire.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, motors and disk drive apparatuses according to embodiments of the present invention will be disclosed.

It is assumed in the present disclosure that a direction parallel to a central axis of a motor is referred to by the term "axial direction", "axial", or "axially", that directions perpendicular to the central axis of the motor are each referred to by the term "radial direction", "radial", or "radially", and that a direction along a circle centered on the central axis of the motor is referred to by the term "circumferential direction", "circumferential", or "circumferentially". It is also assumed in the present disclosure that an axial direction is a vertical direction, and that a side on which a top cover is arranged with respect to a base plate is an upper side, and the shape of each member or portion and relative positions of different members or portions will be described based on the above assumptions. It should be noted, however, that the above definitions of the vertical direction and the upper and lower sides are not meant to restrict in any way the orientation of a motor or a disk drive apparatus at the time of manufacture or when in use.

Figure 1:
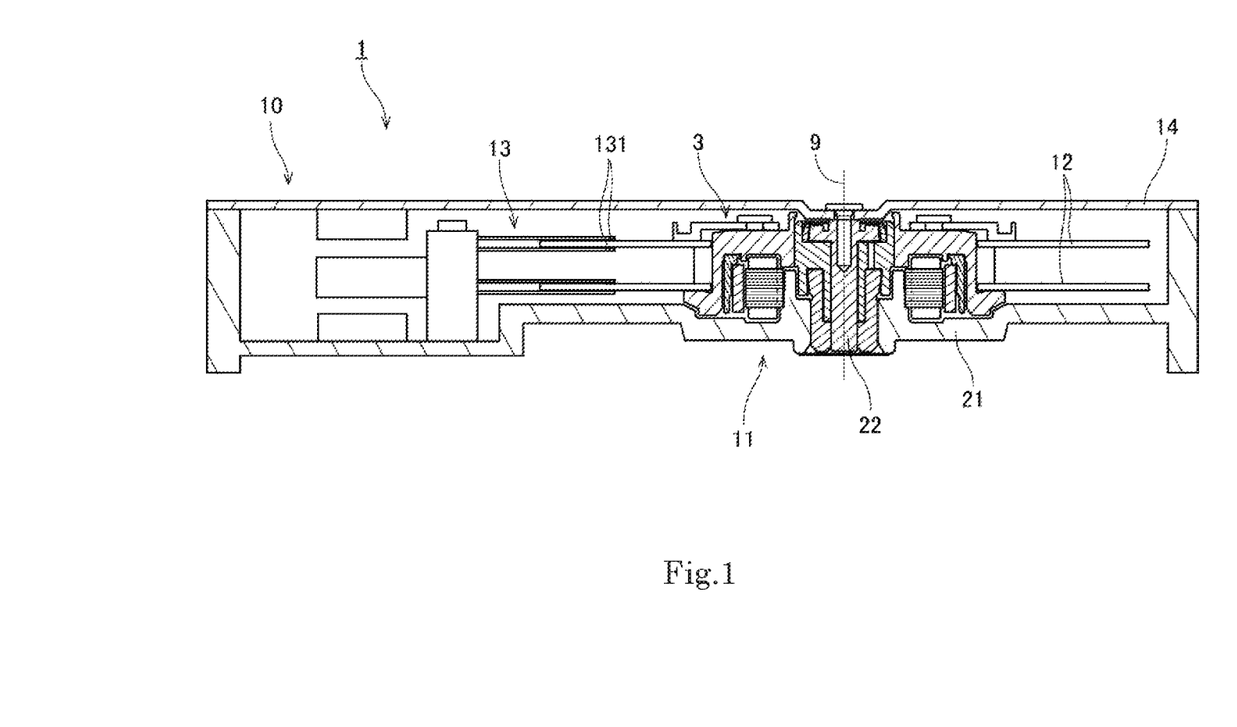
FIG. 1 is a vertical sectional view of a disk drive apparatus according to a first embodiment.

FIG. 1 is a vertical sectional view of a disk drive apparatus 1 in which a motor 11 according to a first embodiment of the present invention is installed. This disk drive apparatus 1 is arranged to rotate magnetic disks 12, each of which includes a circular hole in a center thereof, to perform reading and writing of information from or to the magnetic disks 12. As illustrated in FIG. 1, the disk drive apparatus 1 includes the motor 11, two of the magnetic disks 12, an access portion 13, and a top cover 14.

The motor 11 is arranged to rotate the two magnetic disks 12 about a central axis 9 while supporting the magnetic disks 12. The motor 11 includes a base plate 21 arranged to extend perpendicularly to the central axis 9. An upper side of the base plate 21 is covered with the top cover 14. A rotating portion 3 of the motor 11, the two magnetic disks 12, and the access portion 13 are accommodated in a housing 10 defined by the base plate 21 and the top cover 14. The access portion 13 is arranged to move heads 131 along recording surfaces of the magnetic disks 12 to read and write information from or to the magnetic disks 12.

Note that the number of magnetic disks 12 included in the disk drive apparatus 1 may alternatively be one or more than two. Also note that the access portion 13 may be arranged to perform at least one of the reading and the writing of information from or to the magnetic disk(s) 12.

Figure 2:
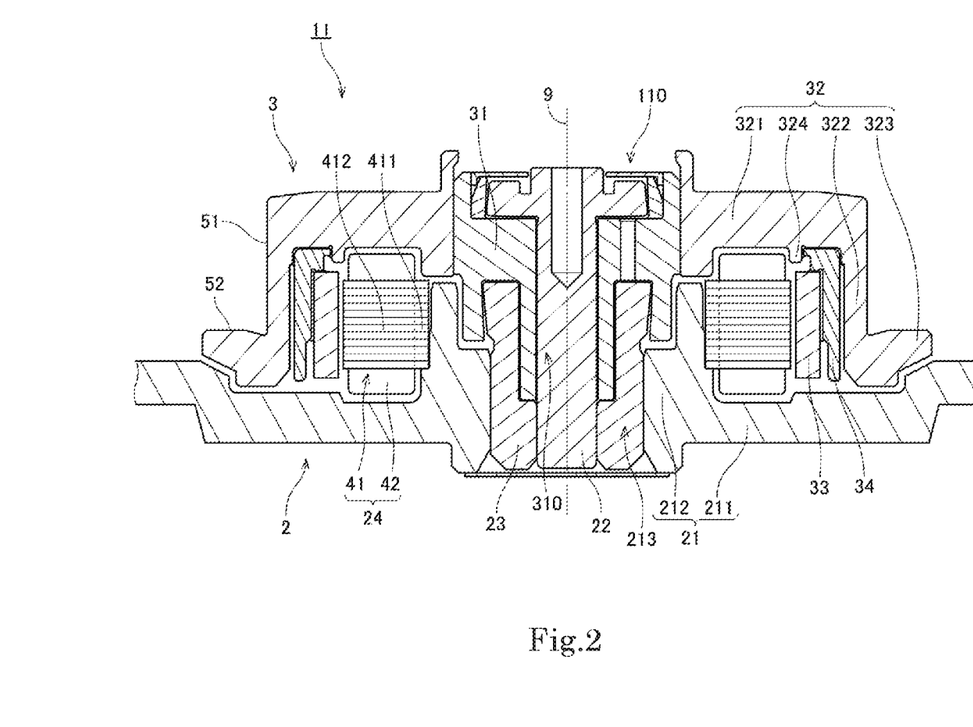
FIG. 2 is a vertical sectional view of a motor according to the first embodiment.

Next, the structure of the motor 11 used in the disk drive apparatus 1 will now be described in more detail below. FIG. 2 is a vertical sectional view of the motor 11. As illustrated in FIG. 2, the motor 11 includes a stationary portion 2 and the rotating portion 3. The stationary portion 2 is arranged to be stationary relative to the housing 10 of the disk drive apparatus 1. The rotating portion 3 is supported to be rotatable with respect to the stationary portion 2.

The stationary portion 2 includes the base plate 21, a shaft 22, a lower annular member 23, and a stator 24.

The base plate 21 includes a base portion 211 and a cylindrical holder portion 212. The base portion 211 is arranged to extend radially below the stator 24, the rotating portion 3, the magnetic disks 12, and the access portion 13. A center hole 213, in which the shaft 22 and the lower annular member 23 are fitted, is defined in the base portion 211. The cylindrical holder portion 212 is arranged to extend in the axial direction to assume a cylindrical shape at an edge portion of the base portion 211 which defines the center hole 213.

The shaft 22 is arranged to extend along the central axis 9. As illustrated in FIG. 1, an upper end portion of the shaft 22 is fixed to the top cover 14 of the disk drive apparatus 1. Meanwhile, as illustrated in FIG. 2, a lower end portion of the shaft 22 is fixed to the cylindrical holder portion 212 of the base plate 21 through the lower annular member 23.

The stator 24 is an armature including a stator core 41 and a plurality of coils 42. The stator core 41 is a magnetic body. The stator core 41 according to the present embodiment is defined by laminated steel sheets, that is, electromagnetic steel sheets placed one upon another in the axial direction. The stator core 41 is fixed to the base plate 21. The stator core 41 includes a core back 411 and a plurality of teeth 412. The core back 411 is arranged in an annular shape with the central axis 9 as a center. The plurality of teeth 412 are arranged to extend radially outward from the core back 411. In addition, the teeth 412 are arranged at substantially regular intervals in a circumferential direction. Each coil 42 is defined by a conducting wire wound around a separate one of the teeth 412.

The rotating portion 3 includes a sleeve 31, a hub 32, a magnet 33, and a yoke 34.

The sleeve 31 is arranged to extend in the axial direction to assume a tubular shape around the shaft 22. The sleeve 31 includes a central through hole 310 arranged to pass therethrough in the vertical direction. At least a portion of the shaft 22 is accommodated in the central through hole 310.

A lubricating fluid is arranged between the sleeve 31 and a combination of the shaft 22 and the lower annular member 23. The sleeve 31 is supported through the lubricating fluid to be rotatable with respect to the combination of the shaft 22 and the lower annular member 23. That is, the shaft 22, the lower annular member 23, the sleeve 31, and the lubricating fluid are arranged to together define a bearing mechanism 110 to support the rotating portion 3 such that the rotating portion 3 is rotatable with respect to the stationary portion 2. Note that the bearing mechanism 110 may not necessarily be a fluid bearing as described above, but may alternatively be a bearing having another structure, such as, for example, a ball bearing or a plain bearing.

The hub 32 is arranged radially outside of the sleeve 31. A metal that is not a ferromagnetic material, such as, for example, an aluminum alloy, is used as a material of the hub 32. Although the sleeve 31 and the hub 32 are defined by separate members in the embodiment illustrated in FIG. 2, the sleeve 31 and the hub 32 may alternatively be defined integrally with each other.

The hub 32 includes a hub upper plate portion 321, a hub cylindrical portion 322, a disk mount portion 323, and a projecting portion 324.

The hub upper plate portion 321 is arranged to extend in an annular shape above the stator 24. In addition, the hub upper plate portion 321 is arranged to extend radially inward from an upper end of the hub cylindrical portion 322. The hub cylindrical portion 322 is arranged to extend downward from a radially outer end portion of the hub upper plate portion 321 to assume a tubular shape. The hub cylindrical portion 322 is arranged radially outside of the yoke 34.

The disk mount portion 323 is arranged to project radially outward from an outer circumference of the hub cylindrical portion 322. In the embodiment illustrated in FIG. 2, the disk mount portion 323 is arranged to project from a lower end portion of the hub cylindrical portion 322. A lower surface of a lower one of the magnetic disks 12 is arranged to be in contact with at least a portion of an upper surface of the disk mount portion 323, which is in the shape of a circular ring. In other words, the upper surface of the disk mount portion 323 is a disk mount surface. The projecting portion 324 is arranged to project downward from a lower surface of the hub upper plate portion 321 to substantially assume the shape of a circular ring.

The magnet 33 is substantially cylindrical in shape, and is arranged radially outside of the stator 24. An inner circumferential surface of the magnet 33 includes north and south poles arranged to alternate with each other in the circumferential direction. In addition, the inner circumferential surface of the magnet 33 is arranged radially opposite to a radially outer end surface of each of the plurality of teeth 412 with a slight gap therebetween. That is, the magnet 33 includes a pole surface arranged radially opposite to the stator 24.

The yoke 34 is a substantially cylindrical member arranged between the hub 32 and the magnet 33. The yoke 34 is made of a metal that is a ferromagnetic material. The yoke 34 is arranged to cover at least a portion of an outer circumferential surface of the magnet 33. This contributes to preventing a magnetic force from leaking through the outer circumferential surface of the magnet 33, that is, contributes to minimizing a reduction in torque of the motor 11.

Once electric drive currents are supplied to the coils 42 in the motor 11 described above, magnetic flux is generated around each of the plurality of teeth 412. Then, interaction between the magnetic flux of the teeth 412 and magnetic flux of the magnet 33 produces a circumferential torque between the stationary portion 2 and the rotating portion 3, so that the rotating portion 3 is caused to rotate about the central axis 9 with respect to the stationary portion 2. The magnetic disks 12 supported by the hub 32 are caused to rotate about the central axis 9 together with the rotating portion 3.

Figure 3:
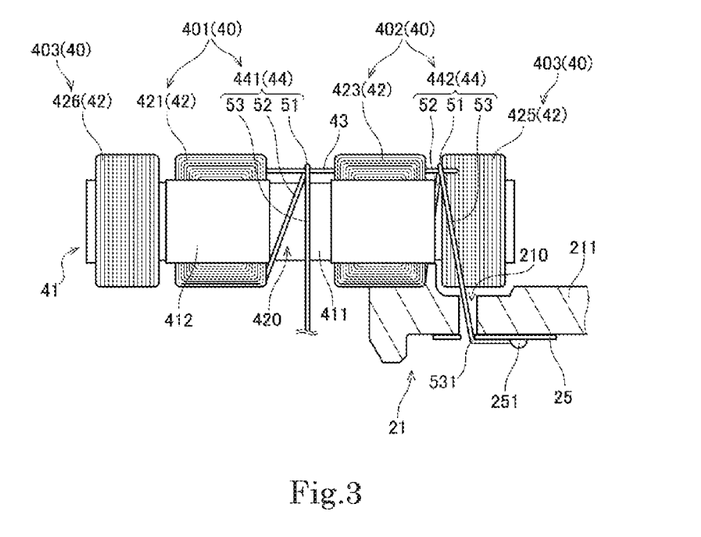
FIG. 3 is a side view of a stator according to the first embodiment.
Figure 4:
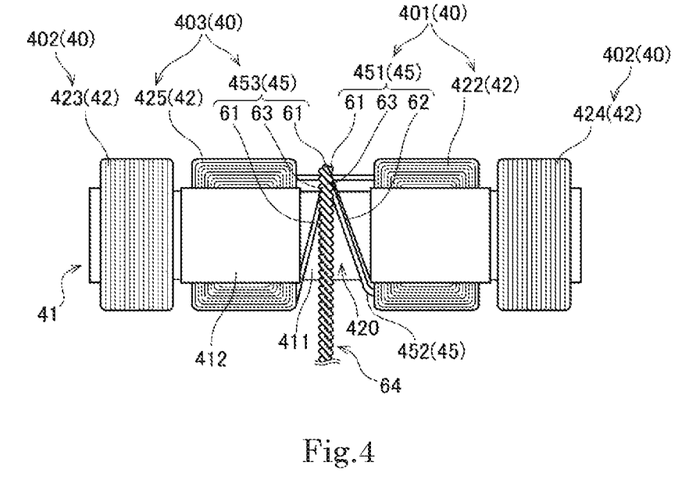
FIG. 4 is a side view of the stator according to the first embodiment.

Next, the configuration of windings of the stator 24, i.e., the configuration of conducting wires 40 defining the coils 42, will now be described below with reference to FIGS. 3 and 4. Each of FIGS. 3 and 4 is a side view of the stator 24. In FIGS. 3 and 4, only portions of the conducting wires 40 which need to be depicted for the present explanation are shown.

In FIG. 3, a section of a portion of the base plate 21 is shown. As illustrated in FIG. 3, the base plate 21 includes, in the base portion 211 thereof, a through hole 210 arranged to pass therethrough in the vertical direction. In addition, a circuit board 25 is arranged on a lower surface of the base portion 211. Each of the conducting wires 40 defining the coils 42 has an end portion drawn out downwardly of the base portion 211 through the through hole 210, and connected to the circuit board 25. The electric drive currents are supplied to the coils 42 through the circuit board 25.

As illustrated in FIGS. 3 and 4, passage lines 43 extending in the circumferential direction, lead wires 44 continuous with the coils 42, and common wires 45 continuous with the coils 42 are each disposed in a circumferential gap 420 between two circumferentially adjacent ones of the coils 42.

Each of the passage lines 43 depicted in FIGS. 3 and 4 is arranged to extend in the circumferential direction on the upper side of the stator core 41. Note that the stator 24 may include, other than the passage lines 43 depicted in FIGS. 3 and 4, a passage line 43 extending in the circumferential direction on the lower side of the stator core 41, or a passage line 43 extending obliquely from above the stator core 41 downward to the lower side of the stator core 41.

Because the motor 11 is a three-phase motor, the stator 24 includes at least three conducting wires 40. The stator 24 according to the present embodiment includes a first conducting wire 401 for a U phase of the motor 11, a second conducting wire 402 for a V phase of the motor 11, and a third conducting wire 403 for a W phase of the motor 11.

Each of the conducting wires 40 includes a plurality of coil portions each of which defines one of the coils 42, a passage portion defining one of the passage lines 43, one of the lead wires 44, which is an end portion of the conducting wire 40 on one end side, and one of the common wires 45, which is an end portion of the conducting wire 40 on another end side.

In addition, the stator 24 illustrated in FIGS. 3 and 4 includes six of the teeth 412 and six of the coils 42. The six coils 42 include a first U-phase coil 421 and a second U-phase coil 422, which are defined by the first conducting wire 401, a first V-phase coil 423 and a second V-phase coil 424, which are defined by the second conducting wire 402, and a first W-phase coil 425 and a second W-phase coil 426, which are defined by the third conducting wire 403.

Each lead wire 44 is continuous with one of the coils 42 which are circumferentially adjacent to the gap 420. That is, this coil 42 and the lead wire 44 are defined by the same conducting wire 40. Each lead wire 44 is continuous with a winding start portion of the corresponding one of the plurality of coils 42. In FIG. 3, a first lead wire 441, which is one of the lead wires 44 which is defined by the first conducting wire 401, and a second lead wire 442, which is one of the lead wires 44 which is defined by the second conducting wire 402, are shown. The first lead wire 441 is directly continuous with the first U-phase coil 421, while the second lead wire 442 is directly continuous with the first V-phase coil 423.

Meanwhile, each common wire 45 is continuous with a winding end portion of a corresponding one of the plurality of coils 42. In FIG. 4, a first common wire 451, which is one of the common wires 45 which is defined by the first conducting wire 401, a second common wire 452, which is one of the common wires 45 which is defined by the second conducting wire 402, and a third common wire 453, which is one of the common wires 45 which is defined by the third conducting wire 403, are shown.

Each lead wire 44 includes a bend portion 51, a led-out portion 52, and a connection portion 53. The bend portion 51 is bent with the corresponding passage line 43 serving as a supporting point in the gap 420. The led-out portion 52 is arranged to extend upward (i.e., to one side in the axial direction) from the coil 42 with which this led-out portion 52 is continuous to the bend portion 51. The connection portion 53 is arranged to extend downward (i.e., to another side in the axial direction) from the bend portion 51. An end portion of the connection portion 53 on a side away from the bend portion 51 is connected to the circuit board 25.

The lead wire 44 changes its direction by bending with the passage line 43 serving as the supporting point as described above. This reduces the likelihood that a slackening of the connection portion 53 of the lead wire 44 will cause the lead wire 44 to slack upward to a large extent. This in turn reduces the likelihood that the lead wire 44 will be brought into contact with any member arranged on the upper side of the stator 24.

More specifically, when the connection portion 53 of the lead wire 44 is pushed upward from the side on which the circuit board 25 lies, a force that raises an end portion of the led-out portion 52 adjacent to the bend portion 51 upward is applied to the led-out portion 52. If the lead wire included no bend portion, a slackening of the lead wire might easily cause a loosening of the coil that is continuous with the lead wire. However, in the case of this stator 24, when the connection portion 53 is pushed upward, a force that raises the bend portion 51 upward is applied to the bend portion 51, so that a force that raises the led-out portion 52 upward is applied to the led-out portion 52. This prevents the coil that is continuous with the lead wire 44 from becoming loose.

At least a portion of a portion of the led-out portion 52 which overlaps with the passage line 43 when viewed in a radial direction is arranged at a position radially inside of the passage line 43 and radially outside of the core back 411. That is, at least a portion of the portion of the lead wire 44 which overlaps with the passage line 43 when viewed in the radial direction is arranged at a radial position between the passage line 43 and the core back 411. Thus, the passage line 43 and the core back 411 serve to restrain a movement of the radial position of the lead wire 44. That is, the lead wire 44 is restrained from becoming slack.

In addition, at least a portion of a portion of the connection portion 53 which overlaps with the passage line 43 when viewed in the radial direction is arranged at a position radially outside of the passage line 43 and radially inward of the radially outer end surfaces of the teeth 412. Thus, a movement of the led-out portion 52 is particularly restrained compared to a movement of the connection portion 53. As a result, the slackening of the led-out portion 52, which is closer to the coil 42, is particularly restrained, to more effectively prevent the coil 42 from becoming loose. In addition, the connection portion 53, which is to be connected to the circuit board 25 after the stator 24 is manufactured, can be more easily changed in position than the led-out portion 52. Therefore, an operation of connecting the connection portion 53 to the circuit board 25 can be performed with improved efficiency in a process of manufacturing the motor 11.

In the present embodiment, the axial position of the bend portion 51 is arranged between upper and lower end surfaces of the coils 42 in the axial direction. This further reduces the likelihood that the lead wire 44 will be brought into contact with any member arranged on the upper side or on the lower side of the stator 24.

As illustrated in FIG. 3, the connection portion 53 of the second lead wire 442 is drawn out from the bend portion 51 downwardly of the base portion 211 through the through hole 210, and is connected to the circuit board 25. Here, a point of connection between the second lead wire 442 and the circuit board 25 is denoted by reference numeral "251". Note that each of the first lead wire 441, a third lead wire 443, and the three common wires 451 to 453 twisted together is also similarly connected to the circuit board 25.

As illustrated in FIG. 3, the position of the bend portion 51 of the second lead wire 442 and the position of the connection point 251 are different when viewed in the axial direction. In addition, the second lead wire 442 includes, between the bend portion 51 and the connection point 251, a lower bend portion 531 which is bent with the base portion 211 or the circuit board 25 serving as a supporting point. The position of the bend portion 51 and the position of the lower bend portion 531 are different when viewed in the axial direction.

The bending of the connection portion 53 at the lower bend portion 531 with the base portion 211 or the circuit board 25 serving as the supporting point results in an application of a tension to the connection portion 53. This further restrains the second lead wire 442 from becoming slack.

As illustrated in FIG. 4, each of the common wires 45 includes a common bend portion 61, a single portion 62, and a common portion 63. The common bend portion 61 is bent in the corresponding circumferential gap 420 between two circumferentially adjacent ones of the coils 42. The single portion 62 is arranged to extend upward (i.e., to one side in the axial direction) from a side (i.e., one end side) of the common bend portion 61 on which the lead wire 44 lies to the common bend portion 61. The common portion 63 is arranged to extend downward (i.e., to another side in the axial direction) from the common bend portion 61 to an opposite side (i.e., another end side) of the common bend portion 61 with respect to the lead wire 44.

The three common wires 45 are disposed in the same gap 420. In addition, the three common wires 45 include twisted portions 64 which are twisted together in at least the common portions 63. At least one of the first conducting wire 401, the second conducting wire 402, and the third conducting wire 403 is bent at the common bend portion 61 with the corresponding passage line 43 serving as a supporting point.

In addition, at least one of the first conducting wire 401, the second conducting wire 402, and the third conducting wire 403 is bent at the common bend portion 61 with the corresponding passage line 43 serving as the supporting point. As will be described in detail below, after being twisted together, the three common wires 45 are bent to define the common bend portions 61. Therefore, of the first conducting wire 401, the second conducting wire 402, and the third conducting wire 403, the ones which do not rely on the passage line 43 as the supporting point are bent with the passage line 43 serving as a reference point.

As described above, the common wires 45 change their direction with the three conducting wires 40 twisted together bending with the passage line 43 serving as the reference point. This reduces the likelihood that a slackening of the common portion 63 of any common wire 45 will cause the common wire 45 to slack upward to a large extent. This in turn reduces the likelihood that each common wire 45 will be brought into contact with any member arranged on the upper side of the stator 24.

More specifically, when the common portion 63 is pushed upward from the side on which the circuit board 25 lies, a force that raises an end portion of the single portion 62 adjacent to the common bend portion 61 upward is applied to the single portion 62. If the common wire 45 included no common bend portion, a slackening of the common portion might easily cause a loosening of the coil that is continuous with the single portion. However, in the case of this stator 24, when the common portion 63 is pushed upward, a force that raises the common bend portion 61 upward is applied to the common bend portion 61, so that a force that raises the single portion 62 upward is applied to the single portion 62. This prevents the coil that is continuous with the common wire 45 from becoming loose.

In addition, in the present embodiment, regarding the one of the first conducting wire 401, the second conducting wire 402, and the third conducting wire 403 which is bent with the passage line 43 serving as the supporting point, a portion of the single portion 62 which overlaps with the passage line 43 is arranged at a radial position between the passage line 43 and the core back 411. That is, this portion is arranged at a position radially inside of the passage line 43 and radially outside of the core back 411. Meanwhile, regarding each of the ones of the first conducting wire 401, the second conducting wire 402, and the third conducting wire 403 which do not rely on the passage line 43 as the supporting point, a portion of the single portion 62 which overlaps with the passage line 43 is arranged at a position radially outside of the passage line 43 and radially inward of tip surfaces of the teeth 412.

Thus, in the twisted portions 64, the common wires 45 of the first conducting wire 401, the second conducting wire 402, and the third conducting wire 403 are twisted together with the passage line 43 being held therebetween. As a result, a binding force is generated between the passage line 43 and the first conducting wire 401, the second conducting wire 402, and the third conducting wire 403 in the vicinity of the common bend portions 61. This contributes to more effectively preventing a slackening of the common portions 63 from causing a slackening of the common bend portions 61 and the single portions 62.

In the present embodiment, the axial position of the common bend portion 61 is arranged between the upper and lower end surfaces of the coils 42 in the axial direction. This further reduces the likelihood that the common wire 45 will be brought into contact with any member arranged on the upper side or on the lower side of the stator 24.

In the present embodiment, as illustrated in FIGS. 3 and 4, each of the lead wires 44 and the common wires 45 is bent with the corresponding passage line 43 extending in the circumferential direction between the adjacent coils 42 on the upper side of the stator core 41 serving as the supporting point. Meanwhile, each of the led-out portions 52 of the lead wires 44 and the single portions 62 of the common wires 45 is arranged to extend upward from below the stator core 41 to the upper side of the stator core 41. Accordingly, each lead wire 44 is bent at an acute angle at the bend portion 51. In addition, each common wire 45 is bent at an acute angle at the common bend portion 61.

As described above, the direction of each of the lead wires 44 and the common wires 45 is changed by 90 or more degrees, and this contributes to more effectively preventing each of the lead wires 44 and the common wires 45 from becoming slack.

Figure 5:
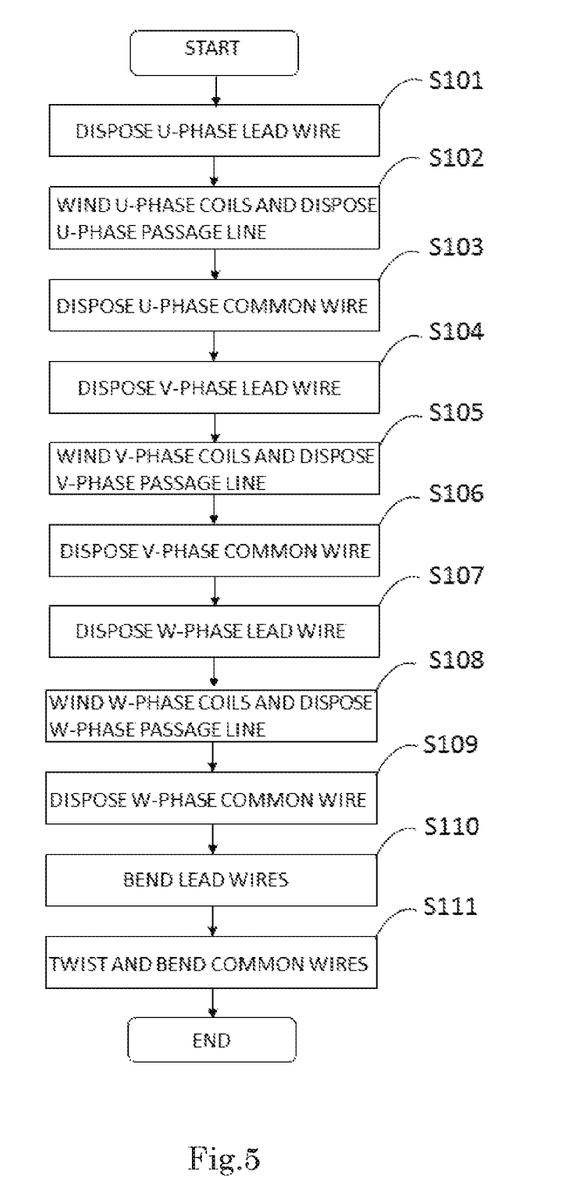
FIG. 5 is a flowchart illustrating a flow of a process of manufacturing the stator according to the first embodiment.
Figure 6:
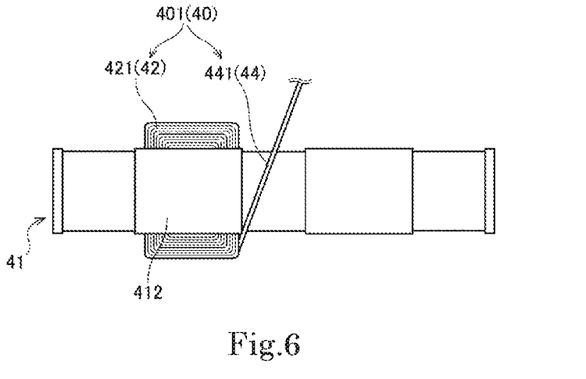
FIG. 6 is a diagram illustrating how the process of manufacturing the stator according to the first embodiment is performed.
Figure 7:
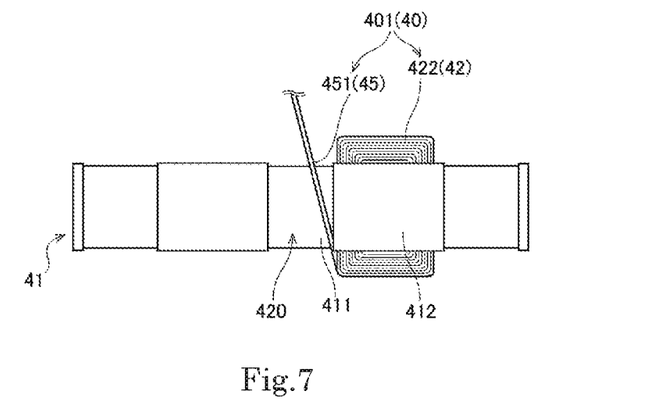
FIG. 7 is a diagram illustrating how the process of manufacturing the stator according to the first embodiment is performed.
Figure 8:
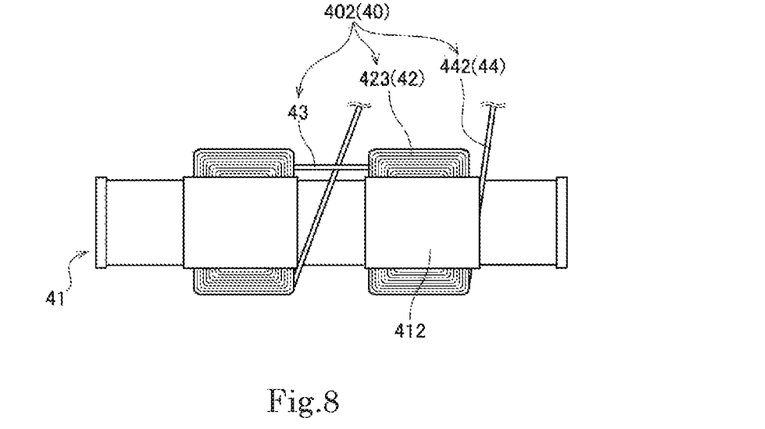
FIG. 8 is a diagram illustrating how the process of manufacturing the stator according to the first embodiment is performed.
Figure 9:
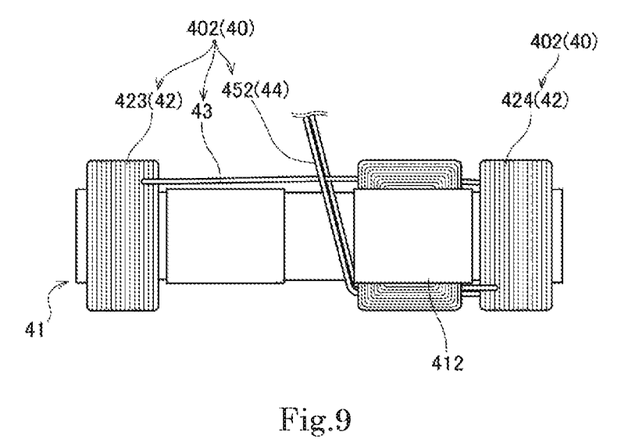
FIG. 9 is a diagram illustrating how the process of manufacturing the stator according to the first embodiment is performed.
Figure 10:
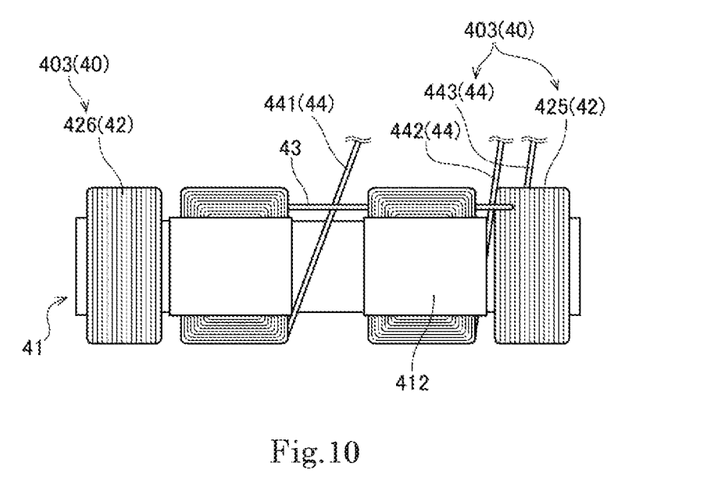
FIG. 10 is a diagram illustrating how the process of manufacturing the stator according to the first embodiment is performed.

Next, a process of manufacturing the stator 24 will now be described below with reference to FIGS. 5 to 12. FIG. 5 is a flowchart illustrating a flow of the process of manufacturing the stator 24. FIGS. 6 to 12 are diagrams illustrating how the process of manufacturing the stator 24 is performed. Each of FIGS. 6, 8, and 10 is a side view illustrating the first U-phase coil 421 and the first V-phase coil 423 as viewed from radially outside. Each of FIGS. 7, 9, 11, and 12 is a side view illustrating the first W-phase coil 425 and the second U-phase coil 422 as viewed from radially outside.

FIG. 5 illustrates the flow of the process of manufacturing the stator 24, in which the conducting wires 40 are wound around the stator core 41. First, the first lead wire 441, which is an end portion of the first conducting wire 401 for the U phase on the one end side, is disposed in the vicinity of the tooth 412 around which the first U-phase coil 421 is to be arranged (step S101).

Next, the first conducting wire 401 is wound around the corresponding teeth 412 to define the first U-phase coil 421 and the second U-phase coil 422, with the passage line 43 for the U phase being disposed (step S102). Specifically, after the first U-phase coil 421 is defined, the passage line 43 is disposed between the first U-phase coil 421 and the tooth 412 around which the second U-phase coil 422 is to be defined, and thereafter, the second U-phase coil 422 is defined.

After the second U-phase coil 422 is defined, the first common wire 451, which is an end portion of the first conducting wire 401 on the other end side, is disposed in one of the gaps between the teeth 412 (step S103). As a result of steps S101 to S103, the first lead wire 441, the first U-phase coil 421, the second U-phase coil 422, and the first common wire 451 are arranged as illustrated in FIGS. 6 and 7.

Next, the second lead wire 442, which is an end portion of the second conducting wire 402 for the V phase on the one end side, is disposed in the vicinity of the tooth 412 around which the first V-phase coil 423 is to be arranged (step S104).

Then, the second conducting wire 402 is wound around the corresponding teeth 412 to define the first V-phase coil 423 and the second V-phase coil 424, with the passage line 43 for the V phase being disposed (step S105). Specifically, after the first V-phase coil 423 is defined, the passage line 43 is disposed between the first V-phase coil 423 and the tooth 412 around which the second V-phase coil 424 is to be defined, and thereafter, the second V-phase coil 424 is defined.

After the second V-phase coil 424 is defined, the second common wire 452, which is an end portion of the second conducting wire 402 on the other end side, is disposed in the gap between the teeth 412 in which the first common wire 451 has been disposed (step S106). As a result of steps S104 to S106, the second lead wire 442, the first V-phase coil 423, the second V-phase coil 424, and the second common wire 452 are arranged as illustrated in FIGS. 8 and 9.

Next, the lead wire 443 for the W phase, which is an end portion of the third conducting wire 403 for the W phase on the one end side, is disposed in the vicinity of the tooth 412 around which the first W-phase coil 425 is to be arranged (step S107).

Then, the third conducting wire 403 is wound around the corresponding teeth 412 to define the first W-phase coil 425 and the second W-phase coil 426, with the passage line 43 for the W phase being disposed (step S108). Specifically, after the first W-phase coil 425 is defined, the passage line 43 is disposed between the first W-phase coil 425 and the tooth 412 around which the second W-phase coil 426 is to be defined, and thereafter, the second W-phase coil 426 is defined.

After the second W-phase coil 426 is defined, the third common wire 453, which is an end portion of the third conducting wire 403 on the other end side, is disposed in the gap between the teeth 412 in which the first common wire 451 and the second common wire 452 have been disposed (step S109). As a result of steps S107 to S109, the third lead wire 443, the first W-phase coil 425, the second W-phase coil 426, and the third common wire 453 are arranged as illustrated in FIGS. 10 and 11.

Note that, when each common wire 45 is disposed, a passage line 43 extending in the circumferential direction between the corresponding coils 42 may be disposed between any of the second U-phase coil 422, the second V-phase coil 424, and the second W-phase coil 426 and a corresponding one of the common wires 451, 452, and 453. In this case, after the second U-phase coil 422, the second V-phase coil 424, or the second W-phase coil 426 is defined, the passage line 43 extending in the circumferential direction is further disposed, and then the common wire 451, 452, or 453 is disposed in step S103, S106, or S109.

When the arrangement of the conducting wires 401 to 403 has been completed through steps S101 to S109, each of the lead wires 441 to 443 for the U phase, the V phase, and the W phase extends from below the corresponding passage line 43 to the upper side of the corresponding passage line 43 as illustrated in FIG. 10. In the present embodiment, each of the first lead wire 441 and the second lead wire 442 is arranged to cross the corresponding passage line 43 at a position radially inside of the corresponding passage line 43 and radially outside of the core back 411.

Figure 11:
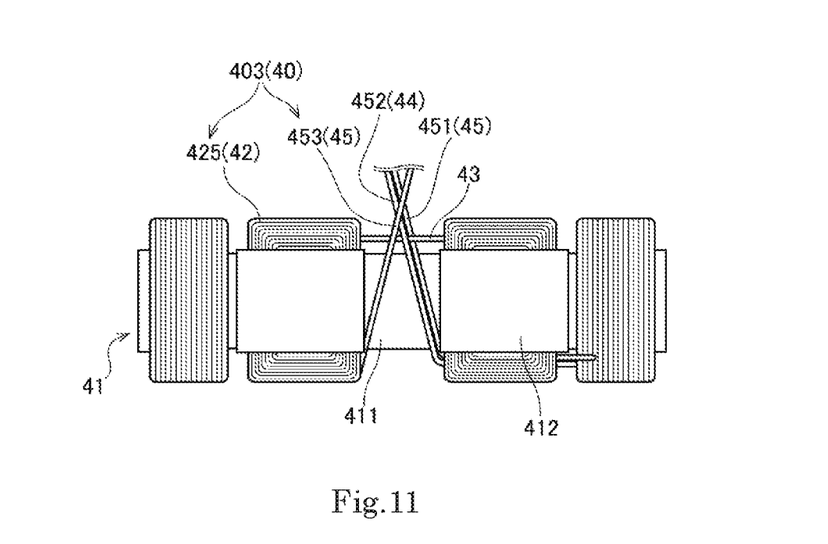
FIG. 11 is a diagram illustrating how the process of manufacturing the stator according to the first embodiment is performed.

In addition, as illustrated in FIG. 11, each of the common wires 451 to 453 for the U phase, the V phase, and the W phase extends from below the corresponding passage line 43 to the upper side of the corresponding passage line 43. In the present embodiment, the first common wire 451 is arranged to cross the corresponding passage line 43 at a position radially inside of the corresponding passage line 43 and radially outside of the core back 411. Meanwhile, each of the second common wire 452 and the third common wire 453 is arranged to cross the corresponding passage line 43 at a position radially outside of the corresponding passage line 43 and radially inward of the tip surfaces of the teeth 412.

Next, each of the lead wires 441 to 443 is bent (step S110). As a result, the bend portion 51 of each of the first lead wire 441 and the second lead wire 442 is defined as illustrated in FIG. 3. Similarly, the bend portion 51 of the third lead wire 443 may also be defined.

Figure 12:
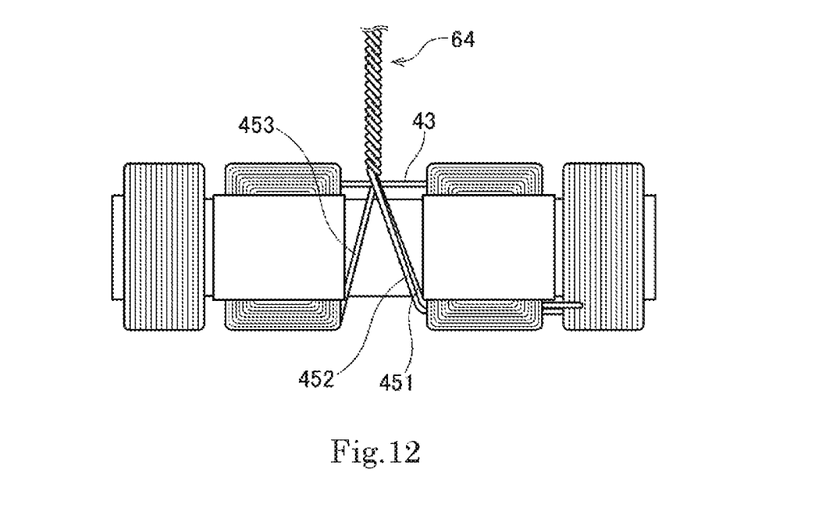
FIG. 12 is a diagram illustrating how the process of manufacturing the stator according to the first embodiment is performed.

Finally, the common wires 45 are twisted together and are bent (step S111). At step S111, the three common wires 451 to 453 are twisted together from a position in the vicinity of the corresponding passage line 43 toward the other end side. As a result, as illustrated in FIG. 12, the three common wires 451 to 453 are twisted together with the corresponding passage line 43 being held therebetween to define the twisted portions 64.

Thereafter, the three common wires 451 to 453 twisted together as a whole are bent with the corresponding passage line 43 serving as the supporting point. As a result, the common bend portion 61 of each of the common wires 451 to 453 is defined as illustrated in FIG. 4.

Figure 13:
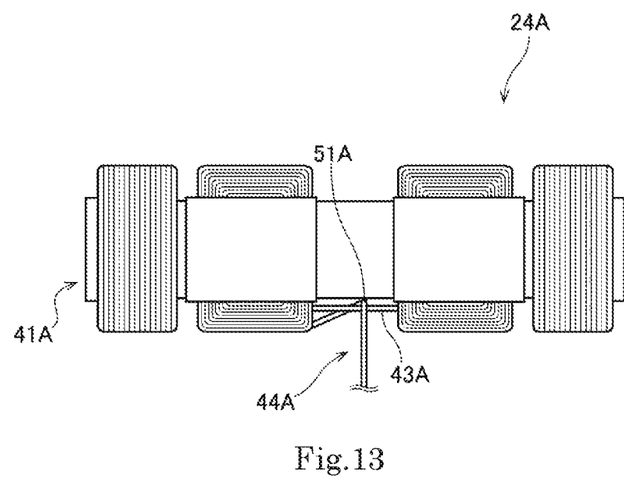
FIG. 13 is a side view of a stator according to an example modification.

FIG. 13 is a side view of a stator 24A according to an example modification of the above-described embodiment. In this stator 24A, a passage line 43A, which serves as a supporting point for a bend portion 51A of a lead wire 44A, is arranged to extend in the circumferential direction between coils 42A on the lower side of a stator core 41A.

Although, in the above-described embodiment, each passage line 43, which serves as the supporting point for the bend portion 51 of the corresponding lead wire 44, is arranged to extend in the circumferential direction between the corresponding coils 42 on the upper side of the stator 24, this is not essential to the present invention. As in the example modification illustrated in FIG. 13, the bend portion 51A may be defined with the passage line 43A extending in the circumferential direction on the lower side of the stator core 41A serving as the supporting point.

Figure 14:
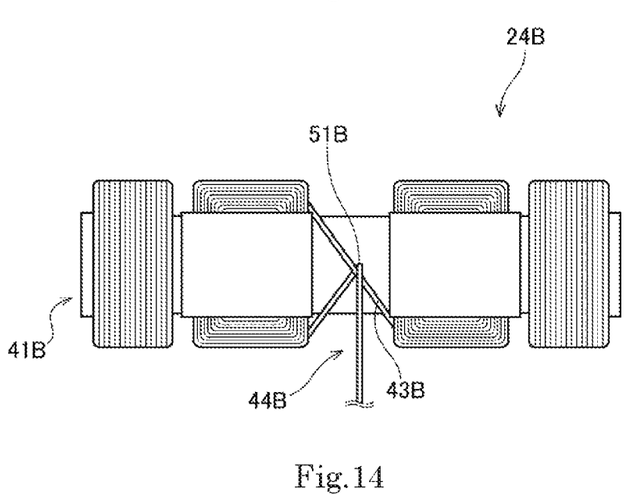
FIG. 14 is a side view of a stator according to an example modification.

FIG. 14 is a side view of a stator 24B according to another example modification of the above-described embodiment. In this stator 24B, a passage line 43B, which serves as a supporting point for a bend portion 51B of a lead wire 44B, is arranged to extend from above a stator core 41B downward to the lower side of the stator core 41B while extending in the circumferential direction between coils 42B. As in this modification, the bend portion 51B may be defined with the passage line 43B extending obliquely from above the stator core 41B downward to the lower side of the stator core 41B between the coils 42B serving as the supporting point.

In addition, in the stator 24 according to the above-described embodiment, both the number of teeth 412 and the number of coils 42 are six. In other words, the number of slots is six. Note, however, that this is not essential to the present invention. The number of slots is not limited to six, but may alternatively be nine or twelve.

Also note that, although the motor according to the above-described embodiment is an outer-rotor motor, the present invention may be applied to an inner-rotor motor. Also note that the present invention may be applied to a motor arranged to rotate a disk other than the magnetic disk, such as, for example, an optical disk.

The present invention is applicable to, for example, stators, motors, disk drive apparatuses, and methods of manufacturing the stators.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stator for use in a motor, the stator comprising:
   a stator core including an annular core back arranged in an annular shape with a central axis as a center, and a plurality of teeth arranged to extend radially from the core back; and
   a plurality of coils each of which is defined by a conducting wire wound around a separate one of the teeth; wherein
   a passage line extending in a circumferential direction is disposed in a circumferential gap between two circumferentially adjacent ones of the coils;
   a lead wire continuous with the conducting wire defining one of the coils includes:
      a bend portion being bent in the gap with the passage line serving as a supporting point;
      a led-out portion arranged to extend from the coil to one side in an axial direction to the bend portion; and
      a connection portion arranged to extend from the bend portion to another side in the axial direction; and
   at least a portion of a portion of the lead wire which overlaps with the passage line when viewed in a radial direction is arranged at a radial position between the passage line and the core back.

2. The stator according to claim 1, wherein an axial position of the bend portion is arranged between upper and lower end surfaces of the coils in the axial direction.

3. The stator according to claim 1, wherein
   the teeth are arranged to extend radially outward from the core back;
   at least a portion of a portion of the led-out portion which overlaps with the passage line when viewed in the radial direction is arranged at a position radially inside of the passage line and radially outside of the core back; and
   at least a portion of a portion of the connection portion which overlaps with the passage line when viewed in the radial direction is arranged at a position radially outside of the passage line and radially inward of radially outer end surfaces of the teeth.

4. The stator according to claim 1, comprising a plurality of the conducting wires including a first conducting wire, a second conducting wire, and a third conducting wire, wherein
   each of the conducting wires includes:
      a plurality of coil portions each of which defines one of the coils;
      a passage portion defining the passage line;
      the lead wire, the lead wire being an end portion of the conducting wire on one end side; and
      a common wire being an end portion of the conducting wire on another end side; and
   the lead wire of at least one of the first conducting wire, the second conducting wire, and the third conducting wire includes the bend portion.

5. The stator according to claim 4, wherein
the common wire of each of the first conducting wire, the second conducting wire, and the third conducting wire includes:
   a common bend portion being bent in a circumferential gap between two of the coils;
   a single portion arranged to extend from the one end side of the common bend portion to one side in the axial direction to the common bend portion; and
   a common portion arranged to extend from the common bend portion to another side in the axial direction to the other end side;
the common wires of the first conducting wire, the second conducting wire, and the third conducting wire are disposed in the same gap, and include twisted portions twisted together in at least the common portions; and
at least one of the first conducting wire, the second conducting wire, and the third conducting wire is bent at the common bend portion with the passage line serving as a supporting point.

6. The stator according to claim 4, wherein
the common wire of each of the first conducting wire, the second conducting wire, and the third conducting wire includes:
   a common bend portion being bent in a circumferential gap between two of the coils;
   a single portion arranged to extend from the one end side of the common bend portion to one side in the axial direction to the common bend portion; and
   a common portion arranged to extend from the common bend portion to another side in the axial direction to the other end side;
the common wires of the first conducting wire, the second conducting wire, and the third conducting wire are disposed in the same gap, and include twisted portions twisted together in at least the common portions; and
at least one of the first conducting wire, the second conducting wire, and the third conducting wire includes a portion arranged at a radial position between the passage line and the core back, and is bent at the common bend portion with the passage line serving as a supporting point.

7. The stator according to claim 5, wherein an axial position of the common bend portion is arranged between upper and lower end surfaces of the coils in the axial direction.

8. A motor comprising:
a stationary portion including the stator of claim 1;
a rotating portion arranged to rotate about a central axis with respect to the stationary portion; and
a bearing mechanism arranged to support the rotating portion such that the rotating portion is rotatable with respect to the stationary portion.

9. The motor according to claim 8, wherein
the stationary portion further includes:
   a base portion arranged to extend substantially perpendicularly to the central axis below the core back and the coils; and
   a circuit board arranged along a lower surface of the base portion;
the base portion includes a through hole arranged to pass therethrough in a vertical direction;
the connection portion of the lead wire is drawn out from the bend portion downwardly of the base portion through the through hole, and is connected to the circuit board; and
a position of the bend portion and a position of a point of connection between the lead wire and the circuit board are different when viewed in an axial direction.

10. The motor according to claim 8, wherein
the stationary portion further includes:
   a base portion arranged to extend substantially perpendicularly to the central axis below the core back and the coils; and
   a circuit board arranged along a lower surface of the base portion;
the base portion includes a through hole arranged to pass therethrough in a vertical direction;
the connection portion of the lead wire is drawn out from the bend portion downwardly of the base portion through the through hole, and is connected to the circuit board;
the lead wire includes, between the bend portion and a point of connection between the lead wire and the circuit board, a lower bend portion being bent with the base portion or the circuit board serving as a supporting point; and
a position of the bend portion and a position of the lower bend portion are different when viewed in an axial direction.

11. A disk drive apparatus comprising:
the motor of claim 8;
at least one disk arranged to rotate about the central axis together with the rotating portion of the motor;
an access portion arranged to perform at least one of reading and writing of information from or to the at least one disk; and
a housing arranged to accommodate the motor, the at least one disk, and the access portion.

* * * * *